H. S. ALBRECHT.
MACHINE FOR THE MANUFACTURE OF METALLIC BALLS.
APPLICATION FILED MAY 9, 1921.

1,438,206.

Patented Dec. 12, 1922.

Inventor.
Herman S. Albrecht,
by Uppey & Kingsland
His Attorneys

Patented Dec. 12, 1922.

1,438,206

UNITED STATES PATENT OFFICE.

HERMAN S. ALBRECHT, OF ST. LOUIS, MISSOURI.

MACHINE FOR THE MANUFACTURE OF METALLIC BALLS.

Application filed May 9, 1921. Serial No. 468,079.

*To all whom it may concern:*

Be it known that I, HERMAN S. AL-BRECHT, a citizen of the United States, residing at the city of St. Louis and State of Missouri, have invented a new and useful Improvement in Machines for the Manufacture of Metallic Balls, of which the following is a specification.

This invention relates to improvements in machines for the manufacture of metallic balls, and consists in the novel construction hereinafter disclosed.

An object of the invention is to provide a machine for forming from irregularly shaped slugs of metal smooth balls of substantially uniform dimensions.

Another object of the invention is to provide a machine comprising a revoluble mandrel having spiral grooves therein, with a presser member fitting over said mandrel whereby balls are rolled from irregularly shaped slugs.

Additional objects of the invention will appear from the following detailed description thereof, taken in connection with the accompanying drawing, in which—

Figure 1:
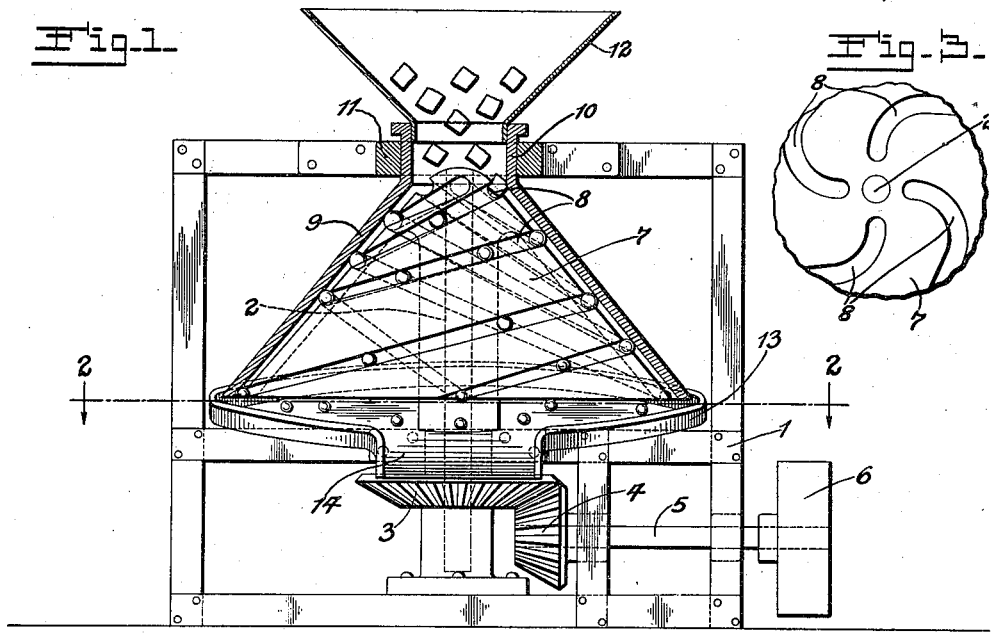
Fig. 1 is an elevation of the machine embodying the invention.
Figure 3:
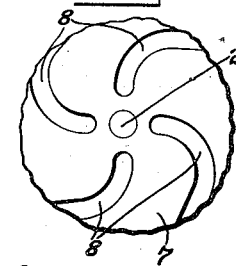
Fig. 3 is a fragmentary plan view of the top of the mandrel.
Figure 2:
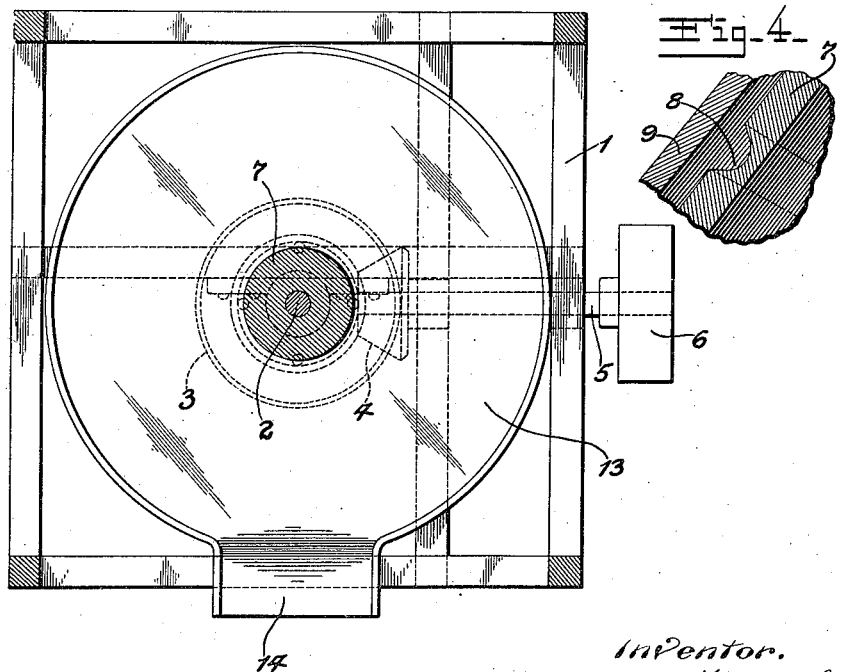
Fig. 2 is a cross section taken substantially on the line 2—2 of Fig. 1.
Figure 4:
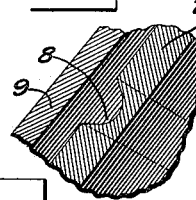
Fig. 4 is a fragmentary sectional view of a portion of the mandrel and presser element, illustrating particularly the form of groove in the mandrel.

In the embodiment of the invention illustrated in the drawing the machine is shown as comprising a frame 1 of any suitable design. A vertical shaft 2 is supported for rotation in the frame and is driven by a beveled gear and pinion construction 3 and 4. The pinion 4 is driven from a power shaft 5 supplied with a power pulley 6.

The shaft 2 carries the mandrel 7 which is preferably in the form of a cone. The surface of the mandrel 7 is provided with any desired number of spiral grooves 8 developing from a point near the apex of the groove to the base thereof. Said grooves are wider at the top than at the bottom, the side walls being slightly flared so as to provide a cross diameter in excess of the diameter of the balls formed by the machine, the grooves gradually decreasing in diameter so that at the base the grooves are substantially half the exact diameter of the balls produced by the machine.

Cooperating with the mandrel 7 is a gravity actuated presser member 9 that fits over the mandrel and is capable of rotary and axial movements when the machine is in operation, said presser member 9 having side walls conforming generally to the shape of the mandrel. At the upper portion of the presser member there is a substantially cylindrical axial extension 10 that fits within a bearing 11 in the frame. As shown the relationship of the extension 10 and the bearing 11 in which it is mounted is such as to permit both vertical and rotary movements of the presser 9 when the machine is in operation.

A hopper 12 is supported above the upper opening of the extension 10 and is designed to contain a quantity of irregularly shaped slugs that feed from the hopper through the extension 10 and onto the mandrel, the slugs being received in the grooves in the mandrel and being rolled between the mandrel and the inner surface of the presser member 9.

The slugs are preferably heated to a degree so that they will be yieldable to the pressure exerted by the presser member against the face of the mandrel, the slugs following the course of the grooves and being gradually formed into spherical bodies conforming substantially to the diameter of the grooves.

Supported below the presser and mandrel is a receiving pan 13 tilted slightly in one direction so that the spherical bodies, as they pass from the space at the base of the mandrel and the base of the presser member, will be discharged upon the pan 13 moving therefrom by gravity through a discharge chute 14.

I claim:

1. A machine of the character described for rolling metallic balls, comprising a conically shaped mandrel having spiral grooves formed in the surface thereof, means for rotating the mandrel, a movable gravity actuated presser element disposed over the mandrel and exerting pressure on bodies received in the grooves of the mandrel, and a bearing guiding the presser element in its movements.

2. A machine of the character described, comprising a rotary mandrel having a spiral groove formed therein, mechanism for rotating said mandrel, a presser member enclosing the mandrel, a passage for delivery of irregularly shaped bodies between the mandrel and presser, and a support in which said presser element is mounted for rotary and axial movements when the machine is in operation.

3. A machine of the character described, comprising a rotary mandrel of conical form having a plurality of grooves formed therein, mechanism for rotating the mandrel, a presser member extending over the mandrel and spaced therefrom, a support in which the presser member is mounted for axial movements when the machine is in operation, a passage for delivering irregularly shaped bodies at the apex of the mandrel and in the space between the mandrel and the presser, and a receiving pan located below the base of the mandrel and presser for receiving the bodies from the space between the same.

4. A machine of the character described, comprising a mandrel having inclined walls with spiral grooves formed therein, a member separately supported and actuated by gravity toward the mandrel, there being a space between said member and the mandrel, means for revolving the mandrel, a hopper for feeding material into the space between the mandrel and said member near the apex thereof, and a pan provided with a discharge chute at the bottom of the mandrel for receiving the objects discharged from the space between the mandrel and said member.

5. In a machine of the character described, a mandrel having inclined walls with channels formed therein, said channels gradually decreasing in cross diameter from the top of the mandrel to the bottom, a presser element having inclined walls fitting over the mandrel and being spaced therefrom, a frame, a support in the frame for revolubly supporting the mandrel, means in the frame for supporting said presser for rotary and axial movements when the machine is in operation, and mechanism whereby said mandrel is revolved.

HERMAN S. ALBRECHT.